UNITED STATES PATENT OFFICE.

PROSPER BARRIÈRE, OF PARIS, FRANCE.

LUMINOUS MATERIAL FOR INCANDESCENT GAS-LIGHTING.

SPECIFICATION forming part of Letters Patent No. 567,571, dated September 8, 1896.

Application filed November 13, 1895. Serial No. 568,836. (No specimens.) Patented in France March 28, 1895, No. 246,163.

*To all whom it may concern:*

Be it known that I, PROSPER BARRIÈRE, a citizen of the Republic of France, residing in Paris, France, have invented a Novel Luminous and Radiating Body for Incandescent Lighting and Methods of Making the Same, (for which I have obtained French Patent No. 246,163, dated March 28, 1895,) of which the following is a specification.

Incandescent gas-lighting, which consists in suspending fireproof luminous substances within the flame of a Bunsen burner, has been realized hitherto in several ways. The illuminating properties possessed by various metallic oxids, such as zirconium, lanthanum, yttrium, thorium, and magnesium, have suggested the idea of making these oxids serviceable as luminous bodies.

The numerous experiments which I have made have enabled me to discover and to satisfy myself of the presence of a novel illuminating-body in a special ore of a sandy nature, obtainable at different places and known as "monazite sand." This body, to which I have given the name "lucium," has properties different from those possessed by the substances used hitherto, and as to the constituency of which new body I am unable to state definitely at present whether it consists in a new element, a mixture of old elements, or a mixture of a new element and old elements, but which I obtain in the manner hereinafter described. The ore is a river sand rich in small rubies. The monazite sands, obtained from different places, have all of them given me lucium; but I have specially experimented with those coming from North Carolina and from Brazil.

The following is an example of an analysis made on a sample of this substance: ($SiO_2$,) silica, 69.7 per cent.; ($P_2O_5$,) phosphoric acid, six per cent.; ($Fe_2O_3$,) iron oxid, 1.92 per cent.; ($Al_2O_3$,) alumina, fifteen per cent.; cerium, lanthanum, didymium, about 2.13 per cent.; moisture, 2.05 per cent.; lime, magnesia, and others, about two per cent.; lucium, 1.80 per cent. Lucium enters into the composition of the ores named in the proportion of from 1.5 to six per cent., according to the samples dealt with.

The composition indicated above necessitates special methods of treatment having for their object to eliminate any harmful substances. The purity of this body is the main condition upon which a satisfactory yield depends.

The ore, on having been porphyrized, is slowly melted in suitable furnaces, with an addition of carbonate of sodium, in the proportion of one part of ore for every two parts of carbonate. This operation, which it takes about three hours to complete, is intended to convert the oxids into insoluble carbonates. This conversion is, of course, made at the melting temperature of carbonate of sodium. After cooling, the powdered mass is lixiviated.

By means of decantation the elimination of the silicates and phosphates of sodium is proceeded with. The carbonates separated by water are then submitted to the action of sulfuric acid, the surplus of which is eliminated by slow calcination. The sulfates are dissolved in cold water, and as the sulfate of lime is rather insoluble, this disposes of a large proportion of lime present, and the solution is then precipitated by means of ammonia. The precipitate on being washed is dissolved in hydrochloric acid, care being taken to properly neutralize it by means of ammonia. To the neutralized solution oxalic acid or a solution of some soluble oxalate is added, and most of the iron and alumina remain in the solution and are separated by filtration. The insoluble oxalates, among which are to be found the oxalates of lucium and of the rarer earths—cerium, lanthanum, didymium, thorium—are converted into sulfates by addition of sulfuric acid, heating, and partial calcination in a muffle-furnace to eliminate the surplus not in combination. The sulfates obtained are then pulverized and put in cold water at a temperature of $+4°$ centigrade, in small quantities, until a solution as nearly saturated as possible is obtained. The magnesia present will probably remain in solution as oxalate of magnesia and thus be separated. The solution obtained is then precipitated by ammonia, whereby traces of magnesia and salts of lime remain in the liquid and are eliminated, while, by filtering, a gelatinous precipitate of oxides of lucium and of the rarer earths—cerium, lanthanum, thorium—is kept on the filter. This precipitate, washed with water, is once more treated by means of sulfuric acid. The surplus of the sulfuric acid is neutralized by sodium. To the solution crystals of sulfate of sodium are added until saturation. After six hours of digestion at ordinary temperature cerium, lanthanum, didymium, in a state of insoluble double sulfates, are separated, while thorium, lucium, and yttrium remain in the filtered liquid. The precipitate is washed in a saturated solution of sulfate of sodium. The prime liquid and the waters from the washing are put together and treated by ammonia, which precipitates lucium, thorium, and yttrium, the only rarer earths remaining.

The precipitate by ammonia, gathered on a filter and washed, is treated, as previously, by sulfuric acid, the surplus of which is neutralized by potassium, and to the solution crystals of sulfate of potassium are added until saturation, which, after from five to six hours of digestion, precipitate all the thorium in a state of insoluble double sulfate. It is filtered and washed with a saturated solution of sulfate of potassium.

The principal liquid and the waters from the washing are treated by ammonia, which precipitates lucium and yttrium. The gelatinous precipitate is separated by filtering, washed with water, and dissolved in the necessary quantity of hydrochloric acid. The excess of hydrochloric acid is neutralized by a careful addition of ammonia.

Now the principal operation of the process begins. It consists in precipitating lucium by means of a warm concentrated solution of hyposulfite of sodium in the hot hydrochloric solution. Lucium alone is precipitated. When it has been in ebullition for some time, I filter and wash with water to eliminate the hyposulfite of sodium. The body obtained contains by way of impurities small quantities of yttrite earths, principally ytterbium. It only remains after this to effect a most thorough washing of the insoluble hyposulfite precipitate thus obtained, using cold water for the purpose. After washing follows solution in hydrochloric acid. If there are any other impurities, they may be removed by any of the well-known methods. The hydrates are then precipitated from the hydrochloric-acid solution by addition of ammonia, and after precipitation the body is energetically washed with distilled water.

I obtain lucium, the characteristic properties of which I will now describe.

Compounds of Lucium.

The anhydrous oxid: The compound obtained as hereinbefore mentioned, and after calcination, is the anhydrous oxid of lucium. It appears as a white mass, slightly grayish, insoluble in acids, even concentrated, and in ebullition, except in concentrated sulfuric acid, which dissolves it when warm, converting it into sulfate.

The hydrated oxid: This oxid is prepared in precipitating the solution of sulfate of lucium by ammonia. It is a white gelatinous precipitate, easily soluble in diluted and even in weak acids. On account of this property salts of lucium may be easily obtained. When calcined, it becomes anhydrous.

The sulfate: It is prepared as hereinbefore mentioned. It is easily soluble in water, by means of which it can form several hydrates. The solution of this salt saturated with sulfate of potassium or sodium does not yield any insoluble double sulfates.

The nitrate: This salt is obtained by dissolving hydrate of lucium in nitric acid. Its solution, when evaporated until of a syrupy consistency, becomes converted into a crystalline mass formed by small white rosy crystals. This salt is very soluble in water. When calcined, it leaves anhydrous oxid of lucium.

The carbonate is obtained by precipitating a salt of lucium soluble in carbonate of sodium. It is a white powder insoluble in water.

The acetate and chlorid are white rosy salts susceptible of crystallization, and obtained by dissolving hydrate of lucium in hydrochloric or acetic acid.

The oxalate is prepared by adding oxalic acid to an aqueous solution of a salt of lucium until saturation. It deposits a white crystalline powder, insoluble, which is oxalate of lucium. When calcined, it yields anhydrous oxid of lucium.

Lucium is different from the other rarer earths known, on account of the following reactions: Sulfate, nitrate, and chlorid of lucium are soluble in water. Oxalate of lucium is insoluble, and this distinguishes it from glucinium. Lucium does not yield, like cerium, lanthanum, and didymium, any double sulfate insoluble with sulfate of potassium. It does not form, as thorium does, any double sulfate insoluble with sulfate of potassium. It is precipitated by hyposulfite of sodium. Yttrium, ytterbium, and the salts of cerium are not precipitated by that hyposulfite. Lastly, its atomic weight—lucium, 104—distinguishes it from the rarer earths known.

Lucium may be applied to the manufacture of skeletons or mantles for incandescent gas-lighting in any of the methods adapted for the manufacture of such articles with other oxids. For instance, a fabric of suitable fibrous material may be impregnated with a solution of the oxid of lucium, and after drying the textile material may be burned out, leaving a skeleton or mantle ready for us.

I claim as my invention—

1. As a new article of manufacture, a luminous material for lighting by incandescence, consisting essentially of lucium, derived from monazite sands and having the characteristics hereinbefore described.

2. The mode herein described of obtaining sands by fusion with carbonate of sodium, separating the silicate and phosphate of sodium, attacking the insoluble carbonates by sulfuric acid, dissolving the sulfates in cold water, causing precipitation by ammonia, dissolving the precipitates in hydrochloric acid, causing precipitation by oxalic acid, conversion of oxalates into sulfates, redissolving these by sulfuric acid, causing precipitation by hyposulfite of sodium and dissolving in hydrochloric acid, all substantially as described.

In testimony whereof I have signed my name to this specification in the presence of two subscribing witnesses.

PROSPER BARRIÈRE.

Witnesses:
 LÉON FRANCKERD,
 CLYDE SHROPSHIRE.